United States Patent
Newell et al.

(10) Patent No.: US 11,032,247 B2
(45) Date of Patent: *Jun. 8, 2021

(54) ENTERPRISE MOBILITY MANAGEMENT AND NETWORK MICRO-SEGMENTATION

(71) Applicant: AirWatch LLC, Atlanta, GA (US)

(72) Inventors: Craig Farley Newell, Atlanta, GA (US); Sulay Shah, Atlanta, GA (US); Adam Rykowski, Alpharetta, GA (US); Leung Tao Kwok, Cumming, GA (US)

(73) Assignee: AIRWATCH LLC, Atlanta, GA (US)

( * ) Notice: Subject to any disclaimer, the term of this patent is extended or adjusted under 35 U.S.C. 154(b) by 5 days.

This patent is subject to a terminal disclaimer.

(21) Appl. No.: 16/701,497

(22) Filed: Dec. 3, 2019

(65) Prior Publication Data

US 2020/0106748 A1    Apr. 2, 2020

Related U.S. Application Data

(63) Continuation of application No. 15/015,686, filed on Feb. 4, 2016, now Pat. No. 10,523,636.

(51) Int. Cl.
*H04L 29/06* (2006.01)
*H04W 12/03* (2021.01)
*H04W 12/37* (2021.01)
*H04W 12/08* (2021.01)

(52) U.S. Cl.
CPC ......... *H04L 63/0272* (2013.01); *H04W 12/03* (2021.01); *H04W 12/37* (2021.01); *H04L 63/029* (2013.01); *H04L 63/0236* (2013.01); *H04L 63/0245* (2013.01); *H04W 12/08* (2013.01)

(58) Field of Classification Search
CPC ............. H04L 63/0272; H04L 63/0236; H04L 63/0245; H04L 63/029; H04W 12/37; H04W 12/03; H04W 12/08
USPC ........................................................... 726/1
See application file for complete search history.

(56) References Cited

U.S. PATENT DOCUMENTS

| | | | |
|---|---|---|---|
| 7,783,720 B1 | 8/2010 | Allavarpu et al. | |
| 8,200,790 B1 | 6/2012 | Reeves et al. | |
| 8,320,384 B2 * | 11/2012 | Oouchi | H04L 45/04 370/395.31 |
| 10,587,505 B1 * | 3/2020 | Morris | H04L 45/02 |

(Continued)

OTHER PUBLICATIONS

Hirotsu et al., "Dynamic and distributed routing control for virtualized local area networks", IEEE, doi: 10.1109/LCN.2010.5735704, 2010, pp. 212-215 (Year: 2010).*

(Continued)

*Primary Examiner* — Peter C Shaw
(74) *Attorney, Agent, or Firm* — Thomas Horstemeyer, LLP

(57) ABSTRACT

Disclosed are various examples for the use of network micro-segmentation in enterprise mobility management. In one example, a network device receives a packet with one or more device management attribute embedded in its header. The network device extracts the device management attribute from the packet header. A compliance status of a client device in an external network is determined based on the device management attribute. The network device forwards the packet based on the compliance status.

20 Claims, 6 Drawing Sheets

(56) References Cited

U.S. PATENT DOCUMENTS

| | | | |
|---|---|---|---|
| 2003/0120763 A1* | 6/2003 | Volpano | H04L 12/4641 |
| | | | 709/223 |
| 2007/0058638 A1 | 3/2007 | Guichard et al. | |
| 2007/0130366 A1 | 6/2007 | O'Connell et al. | |
| 2008/0134300 A1 | 6/2008 | Izatt | |
| 2009/0328109 A1 | 12/2009 | Pavlovskaia et al. | |
| 2010/0165877 A1 | 7/2010 | Shukla et al. | |
| 2011/0033047 A1* | 2/2011 | Volpano | H04L 12/4641 |
| | | | 380/255 |
| 2012/0207041 A1 | 8/2012 | Piernot et al. | |
| 2013/0163757 A1 | 6/2013 | Bellovin et al. | |
| 2016/0226815 A1 | 8/2016 | Wan et al. | |
| 2016/0277359 A1 | 9/2016 | Karunakaran et al. | |
| 2017/0064749 A1 | 3/2017 | Jain et al. | |
| 2019/0132322 A1* | 5/2019 | Song | H04L 12/4641 |

OTHER PUBLICATIONS

Dong et al., Jiang Ming and Yu Jing, "Research on virtual network design based on virtual router", IEEE, doi: 10.1109/ICFIN.2009.5339594, 2009, pp. 66-69 (Year: 2009).*

* cited by examiner

ENTERPRISE MOBILITY MANAGEMENT AND NETWORK MICRO-SEGMENTATION

CROSS-REFERENCE TO RELATED APPLICATION

The present application claims the benefit of and priority to co-pending U.S. patent application Ser. No. 15/015,686, filed on Feb. 4, 2016, entitled "Enterprise Mobility Management and Network Micro-Segmentation," the contents of which are hereby incorporated herein by reference in its entirety.

BACKGROUND

Network security architectures began with a simple model of segregating internal network traffic of an organization from external network traffic. In such a model, internal network traffic is trusted, and external network traffic is untrusted. As a consequence, a device that has access to the internal network of the organization ultimately has access to communicate with any other device on the internal network. This arrangement poses many security issues, however. An attacker who gains access to one device is able to communicate with, and potentially exploit, all other devices on the network. Similarly, an employee who legitimately needs access to one resource on the internal network can inappropriately access other resources on the internal network.

In response to these problems, some organizations started segregating network traffic on a department level or a sub-department level. Devices in different departments can be connected to the internal network using physically separate cabling. For example, accounting department ports can be wired using blue cabling, and customer service department ports can be wired using yellow cabling. The blue cabling can be connected to one physical switch, while the yellow cabling can be connected to another physical switch, thus providing a physical separation between two internal network segments of the organization. Therefore, a device on the accounting department segment cannot communicate with a device on the customer service department segment.

Understandably, physically separate systems can be difficult to implement and maintain. If devices are moved from one port to another, the cabling has to be reconfigured. One solution is to use a virtual local area network (VLAN) architecture. With a VLAN architecture, each port on a router is assigned to a respective virtual network segment. The routers of the organization are configured to route network traffic separately for each virtual network segment. For example, ports corresponding to the devices in the accounting department can be assigned to virtual network segment 0, while the ports corresponding to the devices in the customer service department can be assigned to virtual network segment 1. Although this approach can allow for reconfiguration without having to change physical cabling, it can also be error prone. Moreover, this approach does not account for mobile devices that are not wired into a port or are connected by way of the Internet.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
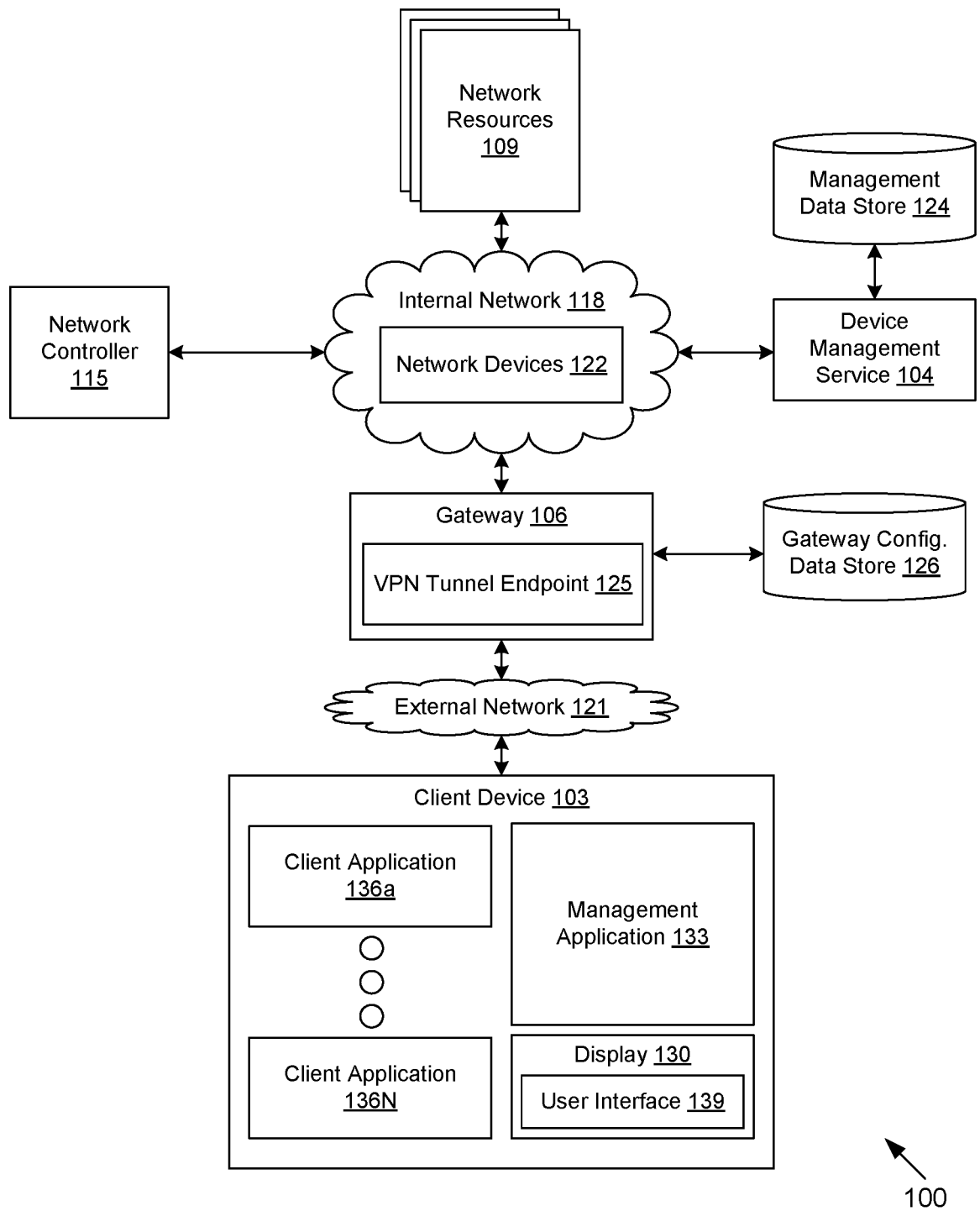
FIG. 1 is a drawing of a networked environment according to various examples of the disclosure.

The present disclosure relates to enterprise mobility management and network micro-segmentation. Network resources on an organization's internal network can be grouped into a variety of security groups. Access to the network resources in a particular security group can be conditioned based on several factors. For example, different applications can be given access to different security groups. Thus, the identity of a particular application can be a factor in providing access to the network resources in a particular security group. Other device management attributes, such as a location of a client device, a user of the client device, an operating system of the client device, a jailbreak status of the client device, can also be used to grant or deny access to a particular security group.

One approach to implementing security groups in an organization's network uses micro-segmentation of the network. A microsegment can correspond to a virtual network where resource permissions are enforced by adding a resource to the microsegment or removing a resource from the microsegment. For example, a spreadsheet containing last quarter's sales data for the organization can be included in a microsegment accessible by management users but not in a microsegment accessible by customer service users. The microsegment security model either replaces or functions in concert with security models that manage access at each resource. A separate network microsegment can, in some examples, be created for at least every grouping of network resources that are to be accessed.

Client applications can be executed on client devices that are not physically coupled to the internal network of the organization. These client devices can be mobile devices owned by the user. In order to provide access to network resources of the organization, the organization can require that the client devices be managed by the organization. Through a device management platform, network traffic between a client application and network resources of the organization can be routed through a virtual private network (VPN) tunnel to a gateway to the internal network.

In various examples of the present disclosure, this gateway or tunnel endpoint can be configured to enforce various rules to permit or deny access to network resources and/or security groups. The rules can be based on the particular application and/or other device management attributes. In some examples, the gateway forwards network traffic to a virtual network segment based at least in part on the device management attributes. Also, the gateway can encode one or more of the device management attributes into packet headers of the network traffic. Other devices in the internal network of the organization can read the device management attributes from the packet headers and also decide whether to forward or how to forward the network traffic. The device management attributes for a client device can continually be reevaluated in deciding whether to forward or how to forward additional network traffic.

With reference to FIG. 1, shown is a networked environment 100 according to various examples. The networked environment 100 includes a client device 103, a gateway 106, a plurality of network resources 109, a network controller 115, an internal network 118, and an external network 121. The gateway 106, the device management service 104, the network resources 109, and the network controller 115 can be coupled to the internal network 118, while the gateway 106 and the client device 103 can be coupled to the external network 121. Each of the internal network 118 and the external network 121 can include, for example, wide area networks (WANs), local area networks (LANs), wired networks, wireless networks, other suitable networks, or any combination of two or more networks. For example, the networks can include satellite networks, cable networks, Ethernet networks, and other types of networks. It is noted that the internal network 118 can include a number of network devices 122 such as routers, switches, and firewalls.

The device management service 104, the gateway 106, the network resources 109, and the network controller 115 can include, for example, a server computer, a network device, or any other system providing computing capabilities. Alternatively, the device management service 104, the gateway 106, the network resources 109, and the network controller 115 can employ multiple computing devices that can be arranged, for example, in one or more server banks, computer banks, or other arrangements. The computing devices can be located in a single installation or can be distributed among many different geographical locations. For example, the device management service 104, the gateway 106, the network resources 109, and the network controller 115 can include multiple computing devices that together form a hosted computing resource, a grid computing resource, or any other distributed computing arrangement.

In some cases, the device management service 104, the gateway 106, the network resources 109, and the network controller 115 can operate as at least a portion of an elastic computing resource where the allotted capacity of processing, network, storage, or other computing-related resources can vary over time. The device management service 104, the gateway 106, the network resources 109, and the network controller 115 can also include or be operated as one or more virtualized computer instances. Generally, the device management service 104, the gateway 106, the network resources 109, and the network controller 115 can be operated in accordance with particular security protocols such that they are considered trusted computing environments. The device management service 104, the gateway 106, the network resources 109, and the network controller 115 can be located remotely with respect to the client device 103.

The device management service 104 can manage or oversee the operation of multiple client devices 103. In some examples, an enterprise, such as one or more companies or other organizations, can operate the device management service 104 to oversee or manage the operation of the client devices 103 of employees, contractors, or other users within an enterprise environment. In this sense, the client devices 103 can include managed devices that are managed by the device management service 104.

The client device 103 can be enrolled as a managed device with the device management service 104 through APIs provided by the operating system. The enrollment process can include authentication of a user's credentials. Upon authentication of a user's credentials by the device management service 104, the client device 103, using device management APIs of the operating system, can enroll the client device 103 as a managed device so that various management functions can be performed by the device management service 104.

Examples of management functions can include commands to erase certain data from the client device 103, commands to install certain applications or application updates, commands to lock a client device 103 or activate a display lock feature, a command to remotely perform a factory reset of the client device 103, or other management functions. Additionally, data can be securely transmitted through a secure communications channel to the client device 103 or applications executed by the client device 103.

Additionally, the operating system of the client device 103 can also provide the ability to create access-restricted storage that is associated with particular applications installed on the client device 103. Access-restricted storage can be associated with multiple applications that are installed on the client device 103 through the secure communications channel. In some scenarios, applications that are signed by a common certificate can be provided access to the access-restricted storage of each other, whereas applications that are not signed by the certificate do not have access to the access-restricted storage of other applications. Additionally, the device management service 104 can transmit data to the client device 103 over the secure communications channel that can be stored in the access-restricted storage such that it is accessible by certain applications and inaccessible to other applications that are installed on the client device 103.

The device management service 104 can also facilitate ensuring that client devices 103 that are administered by the device management service 104 are operating in compliance with various compliance rules. In one scenario, the device management service 104 can issue management commands that instruct a client device 103 to take a particular action with respect to a compliance rule. For example, if a client device 103 is designated as lost or stolen, the device management service 104 can issue a command instructing the client device 103 to erase data and applications that were previously sent to the client device 103 through the secure communications channel or other communication links and otherwise stored on the client device 103. The device management service 104 can also obtain data from a third party computing environment, such as an application, a security code, authentication token, or other data. As another example, if the device management service 104 determines that a client device 103 has violated a compliance rule with respect to having unauthorized modifications or unauthorized applications installed on the client device 103, the device management service 104 can issue a command instructing the client device 103 to erase data and applications stored on the client device 103. As a further example, the device management service 104 can also issue a command instructing the client device 103 to activate a display lock of the client device 103 that requires a user to enter a personal identification number (PIN) in order to use the client device 103.

The data stored in the management data store 124 and available to the device management service 104 includes, for example, authentication data, compliance rules, device data, and potentially other data. The authentication data can include data used to verify one or more security credentials presented by a user for authentication. To this end, secure certificates can be stored and then be made available to the client device 103 that has been authenticated in order to encrypt the secure communications channel and/or for other functions.

Within the context of an enterprise, compliance rules include one or more rules that, when violated, can cause the device management service 104 to issue a management command. Compliance rules can include a list of unauthorized hardware functions, software functions, or applications that potentially pose a threat to enterprise data or to the use of enterprise applications. As noted above, if client device 103 falls out of compliance with one or more compliance rules, a management command can be transmitted to the client device 103 instructing the client device 103 to perform one or more actions specified by the compliance rule. Alternatively, a compliance rule can also reside on the client device 103, which can self-enforce compliance rules. The management data store 124 can also include user account data. User account data can include information with which a user account can be authenticated, such as user credentials. User account data can also include data such as email, contact, calendar data, documents, files or other data that is associated with a user account.

Device data can represent data stored in the management data store 124 that is associated with client devices 103 that are enrolled with the device management service 104 as managed devices. Device data can include a unique device identifier associated with the client device 103, device policies that are associated with a particular client device 103, status information associated with a particular client device 103, and other data that facilitates management of the client device 103 by the device management service 104. Device data can also include user data that is synchronized with a particular client device 103. A user account can be associated with multiple client devices 103. Different client devices 103 associated with a user account can have different user account data stored thereon. For example, a user's smartphone can have a certain number of documents or email messages stored on the device, whereas the user's laptop or tablet can have varying amounts of types of user account data stored on the device.

The gateway 106 establishes network tunnels with client devices 103 through the external network 121 in order to provide the client devices 103 with a secure connection to the network resources 109 coupled to the internal network 118. In other words, the gateway 106 restricts the access of the client device 103 to devices coupled to the internal network 118 by requiring the client device 103 to first establish a secure tunnel with the gateway 106. Each of the secure tunnels terminate at a virtual private network (VPN) tunnel endpoint 125 of the gateway 106. A tunnel uses a tunnel header to encapsulate the packets from one type of protocol in the datagram of a different protocol. Tunnels in some examples use point-to-point tunneling protocol (PPTP) to encapsulate internet protocol (IP) packets over a public network, such as the Internet. A tunnel encrypts the payload of its packets with one or more keys or secure certificates. This allows packets to be exchanged between the client device 103 and the gateway 106 securely. In some examples, the gateway 106 (1) encapsulates and encrypts packets sent from the internal network 118 to the client device 103 with a tunnel packet header, and (2) decapsulates tunnel headers from the packets that it receives from the client device 103, and decrypts these packets, before forwarding the packets to network elements of the internal network 118.

When a client device 103 tries to establish a tunnel connection with the gateway 106, the gateway 106 in some examples passes the credential set that it gets from the client device 103 to the device management service 104 in order to authenticate the request. In authenticating the credential set, the device management service 104 in some examples provides one or more mobile device management (MDM) attributes for the client device 103, the user (of the client device 103), and/or the application (executing on the client device 103) requesting the connection.

The gateway 106 associates the provided MDM attribute (s) with the data messages that it subsequently received from the client device 103 through the established connection. Also, once the connection is established, the client device 103 embeds one or more MDM attributes for the data messages that it sends in the tunnel header in some embodiments. In some examples, the gateway 106 aggregates the MDM attributes that it receives from the device management service 104 and the client device 103 into one set of MDM attributes that it associates with the data messages transmitted by the client device 103 through its connection.

Based on the associated MDM attribute set, the gateway 106 performs one or more operations on the data messages that it receives from the client device 103 through the tunnel. The associated MDM attribute set provides the context for processing the data processing rules that the gateway 106 enforces in some examples. In some examples, the rule identifiers of the rules are not only defined by reference to MDM attribute values but also by the flow identifier values (e.g., the L2-L4 header values) of the data message flows.

In one example, the gateway 106, as configured by data in the gateway configuration data store 126, assigns a network address meeting predefined criteria (e.g., within a certain subnetwork) based on the associated MDM attribute set. The assigned network address can be permitted access to certain network resources 109 on a micro-segment of the internal network 118. As an example, the gateway 106 can assign an internet protocol (IP) address in the range "10.123.1.x" to a VPN tunnel endpoint 125 to enable the VPN tunnel endpoint 125 to communicate with network resources 109 corresponding to sales department servers. As another example, the gateway 106 can assign an IP address in the range "10.124.1.x" to a VPN tunnel endpoint 125 to enable the VPN tunnel endpoint 125 to communicate with network resources 109 corresponding to accounting department servers.

The network resources 109 provide corresponding services for client applications. The services can include, for example, social networking services, email services, voice communication services, enterprise information management services, productivity services, game services, databases, and other services. The network resources 109 can communicate with the client device 103 over the external network 121 and the internal network 118 by way of hypertext transfer protocol (HTTP), simple object access protocol (SOAP), representational state transfer (REST), and/or other protocols.

The network controller 115 is executed to control the gateway 106 and network devices 122 within the internal network 118 (e.g., firewalls, routers, bridges, intrusion detection systems, network address translation systems, port address translation systems) in order to implement virtual network segments within the internal network 118 for applications of the client device 103 to access a particular set of network resources 109. A virtual network segment, or micro-segment, can be established for each set of network resources 109 such that network traffic from a VPN tunnel endpoint 125 is routable in the internal network 118 only to an approved set of network resources 109 and not to other network resources 109. A given network resource 109 can accessible through a plurality of different virtual network segments.

Figure 2:
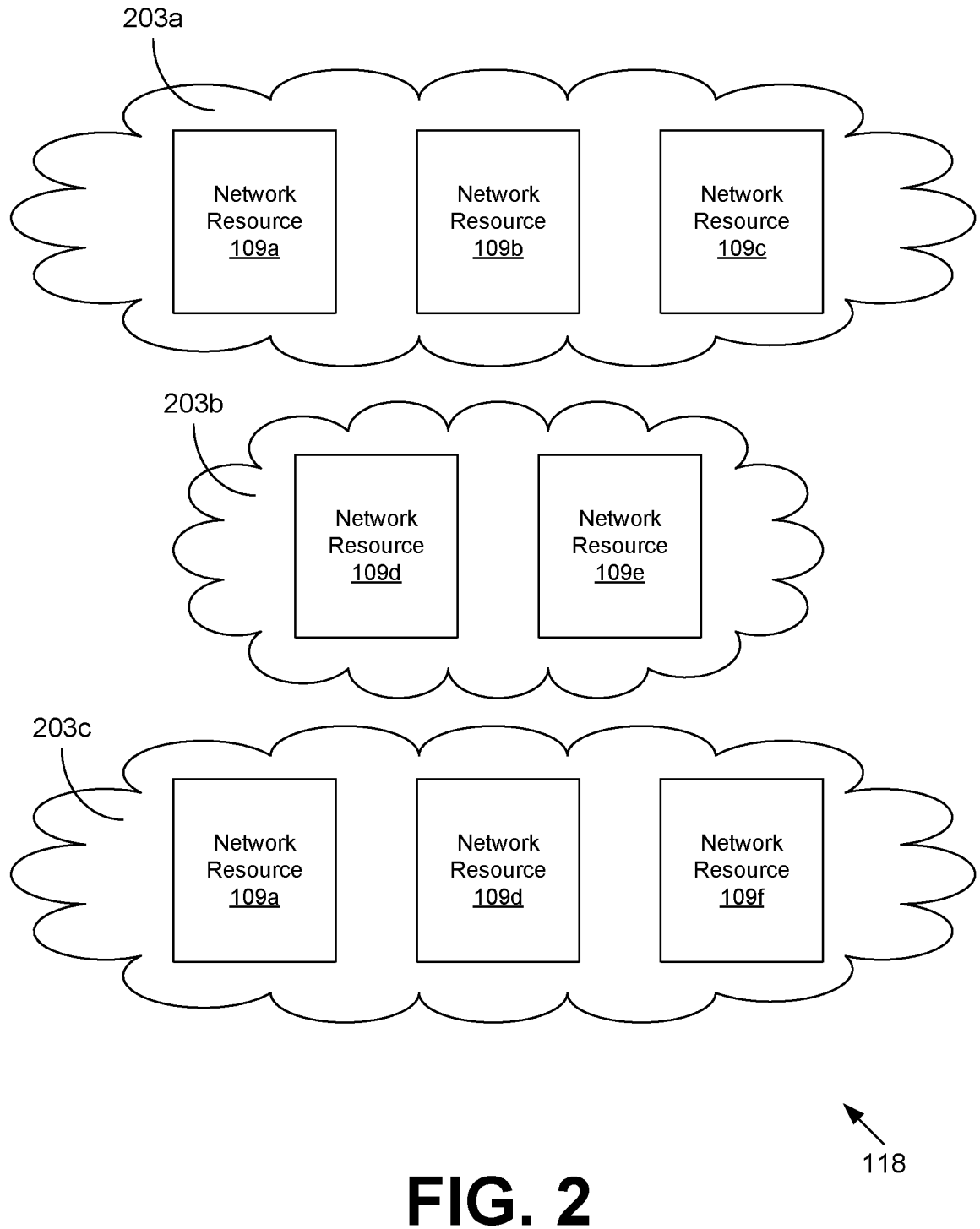
FIG. 2 is a drawing of an example of an internal network with multiple virtual network segments, which can each be associated with different security groups.

Referring now to FIG. 2, shown is one example of an internal network 118 with multiple virtual network segments 203a, 203b, 203c, which can each be associated with different security groups. In this example, the virtual network segment 203a includes network resource 109a, network resource 109b, and network resource 109c. Virtual network segment 203b includes network resources 109d and 109e. Virtual network segment 203c includes network resources 109a, 109d, and 109f. It is noted that the network resource 109a is accessible through multiple virtual network segments 203a and 203c. Similarly, the network resource 109d is accessible through virtual network segments 203b and 203c. This illustrates that a different combination of resources can be made available through individual virtual network segments 203. Examples of network resources 109 can include links to file repositories or portions thereof, particular servers, particular accounts on a server, particular virtual machines or particular data stored by a virtual machine, and particular computing devices.

Referring back to FIG. 1, the client device 103 can represent a processor-based system, such as a computer system, that can be embodied in the form of a desktop computer, a laptop computer, a personal digital assistant, a cellular telephone, a smartphone, a set-top box, a music player, a web pad, a tablet computer system, a game console, an electronic book reader, or any other device with like capability. The client device 103 can include a display 130 that includes, for example, one or more devices such as liquid crystal display (LCD) displays or other types of display devices. The client device 103 can also be equipped with networking capability or networking interfaces, including a localized networking or communication capability such as a near-field communication (NFC) capability, radio-frequency identifier (RFID) read and/or write capability, a microphone and/or speaker, or other localized communication capability.

The client device 103 can execute various applications, such as a management application 133, a plurality of client applications 136a ... 136N, and other applications, services, or processes. The management application 133 can receive security credentials from a user and authenticate with the device management service 104. Although described as an application, it is understood that the management application 133 can be an integral component of an operating system of the client device 103. The client applications 136 correspond to a variety of applications that are employed to access services provided by the network resources 109. The client applications 136 can include a web view component, whereby the client applications 136 interact with the network resources 109 to obtain network content by way of hypertext transfer protocol (HTTP) requests and responses. Alternatively, the client applications 136 can communicate with the network resources 109 using user datagram protocol (UDP), real-time transport protocol (RTP), and/or other protocols. The client applications 136 and the management application 133 can individually render a respective user interface 139 upon the display 130.

Figure 3:
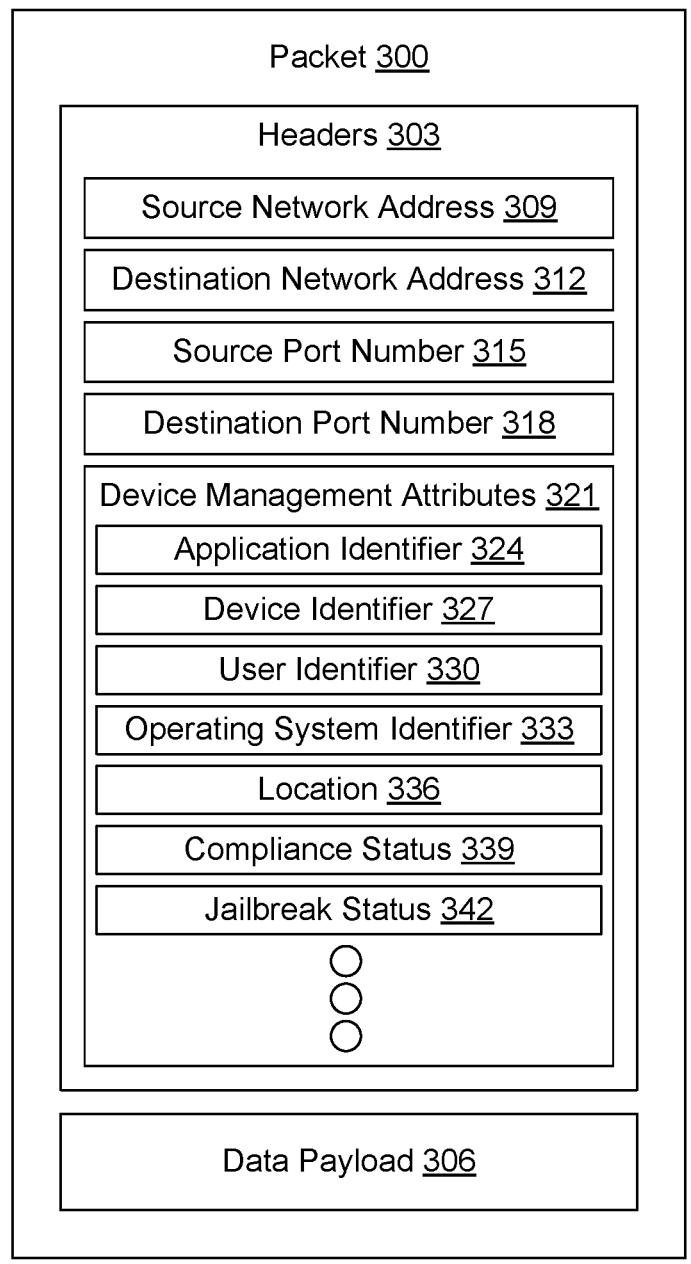
FIG. 3 is a drawing of an example packet format used in an internal network of the networked environment of FIG. 1.

Continuing now to FIG. 3, shown is one example of a format for a packet 300 according to the present disclosure. The packet 300 can correspond to a frame, a datagram, a segment, or any other type of data packet transmitted over the internal network 118. The packet 300 is generated by the gateway 106 from data received through the VPN tunnel over the external network 121 from the client device 103. The packet 300 includes a plurality of headers 303 and a data payload 306.

Among the various headers 303, the packet 300 can include a source network address 309 and a destination network address 312, which can be, for example, internet protocol (IP) addresses. The packet 300 can also include a source port number 315 and a destination port number 318, which can correspond, for example, to transmission control protocol (TCP) or user datagram protocol (UDP) ports. The source network address 309 and/or the source port number 315 can be manipulated by the gateway 106 through network address translation (NAT) and/or port address translation (PAT). In some examples, the source network address 309 and/or the source port number 315 can be used by devices on the internal network 118 to route the packet 300 to specific virtual network segments.

The headers 303 of the packet 300 can also include one or more device management attributes 321. In one example, the device management attributes 321 can be included as generic routing encapsulation (GRE) headers in the packet 300. The device management attributes 321 are associated with the client device 103 that originated the data payload 306 and can be used to enforce routing rules for specific virtual network segments of the internal network 118. As an example, the device management attributes 321 can include an application identifier 324, a device identifier 327, a user identifier 330, an operating system identifier 333, a location 336, a compliance status 339, a jailbreak status 342, and/or other attributes.

The application identifier 324 can correspond to a reverse domain name associated with a client application 136 that uniquely identifies the type and source of the client application 136. In some cases, the application identifier 324 can identify a specific version of the client application 136. Also, where client applications 136 are grouped into types of applications, the application identifier 324 can identify the application grouping. The device identifier 327 can uniquely identify the client device 103 that originated the data payload 306. The user identifier 330 can uniquely identify the specific user who is associated with the client device 103.

The operating system identifier 333 can identify the type of operating system executed by the client device, such as ANDROID, IOS, or WINDOWS. Further, the operating system identifier 333 can identify a specific version of the operating system that is used. The location 336 corresponds to a location of the client device 103, such as a country code or a geographic location specified in latitude and longitude. The compliance status 339 can indicate whether the client device 103 is in compliance with one or more compliance rules. The jailbreak status 342 can indicate whether the client device 103 is in a "jailbroken" or "rooted" state. In one example, the compliance status 339 and the jailbreak status 342 can each be a Boolean value.

Figure 4:
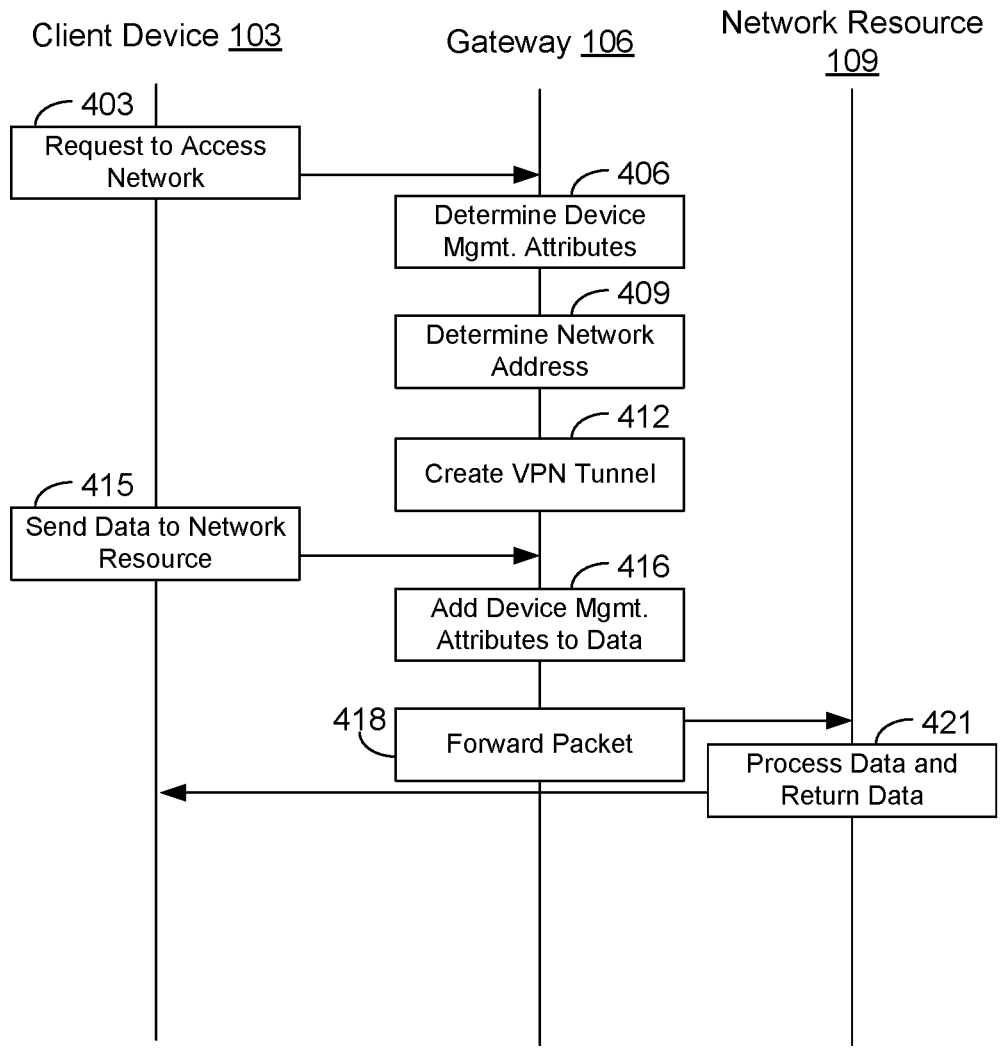
FIG. 4 is a sequence diagram illustrating an example component interaction according to various examples of the present disclosure.

Turning now to FIG. 4, shown is a sequence diagram 400 illustrating one example of interaction between a client device 103, a gateway 106, and a network resource 109. Functionality attributed to each of the client device 103, the gateway 106, and the network resource 109 can be implemented in fewer processes or application or in additional processes or applications. The separation or segmentation of functionality as discussed herein is presented for illustrative purposes only.

Beginning with step 403, a client application 136 on a client device 103 requests to access a network resource 109 of the internal network 118. This request is sent from the client device 103 over the external network 121 to the gateway 106. At step 406, the gateway 106 determines device management attributes 321 of the request such as, for example, application identifier 324, device identifier 327, user identifier 330, application version, operating system identifier 333, device location 336, compliance status 339, jailbreak status 342, and other MDM attributes. At step 409, the gateway 106 determines a network address and/or port address to be assigned to the VPN tunnel endpoint 125. In one example, the network address and/or the port address are assigned based on the client application 136 and/or one or more MDM attributes in order to provide access to a set of network resources 109 of a security group. For example, the gateway 106 can assign an IP address of "10.12.137.1" in order to access a particular set of network resources 109 for customer service representatives employed by the organization.

At step 412, the gateway 106 creates a VPN tunnel endpoint 125 having the network address. In some cases, a particular network address can be shared by several VPN tunnels. This can involve port address translation, where separate tunnels are assigned different port numbers with a single network address. At step 415, the client application 136 on the client device 103 sends data to a particular network resource 109. This data can be sent through a per-application VPN tunnel over the external network 121 to the VPN tunnel endpoint 125 in the gateway 106. At step 416, the gateway 106 adds the device management attributes 321 to the headers 303 of a packet 300 bearing the data in the data payload 306.

At step 418, the gateway 106 forwards the packet 300 to the network resource 109 over the internal network 118 using the assigned network address. In some cases, the gateway 106 can continually reevaluate the device management attributes 321 for compliance and forward in response to determining continued compliance. Moreover, the routers, firewalls, switches, and/or other devices in the internal network 118 can be configured to evaluate the device management attributes 321 and route the data to the network resource 109 based on the device management attributes 321. At step 421, the network resource 109 processes the received data in the data payload 306 and returns other data back to the client device 103 by way of the gateway 106 and the VPN tunnel endpoint 125.

Figure 5:
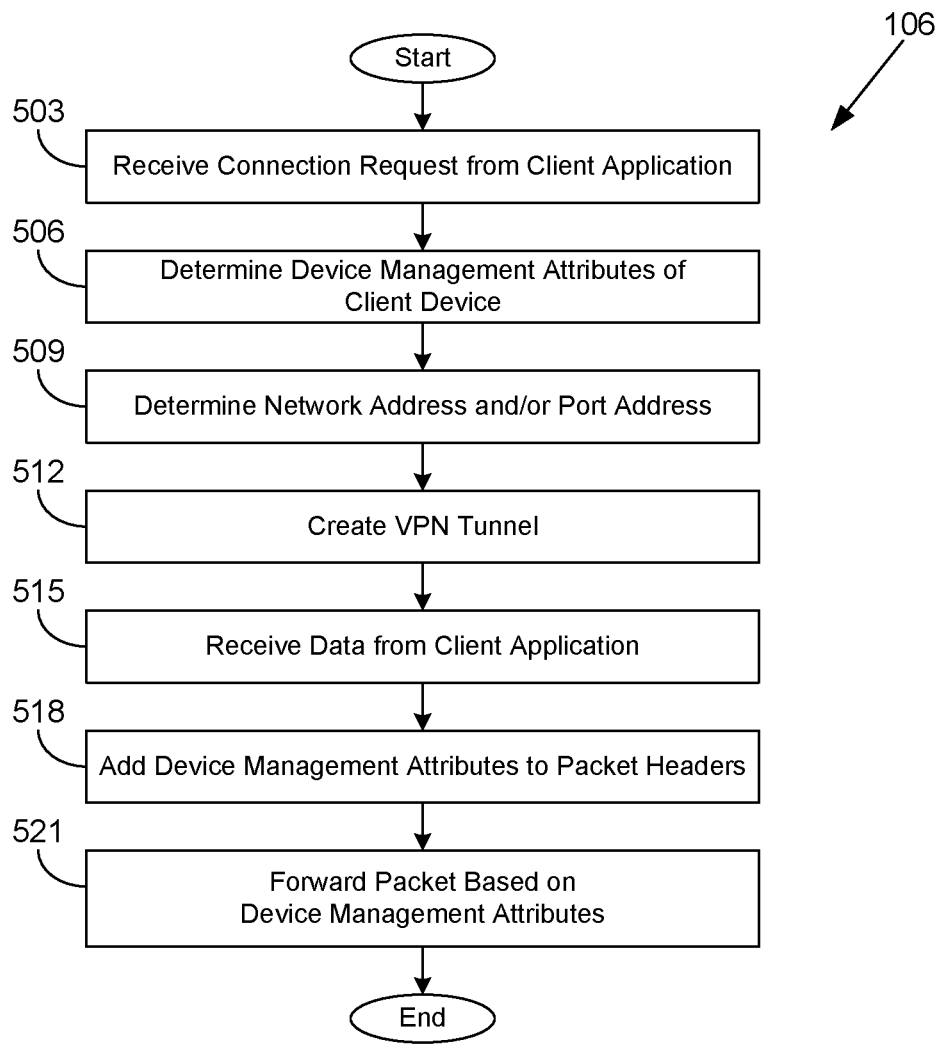
FIGS. 5 and 6 are flowcharts illustrating examples of functionality according to various examples of the present disclosure.

Continuing to FIG. 5, shown is a flowchart that provides one example of the operation of a gateway 106. Functionality attributed to the gateway 106 can be implemented in a single process or application or in multiple processes or applications. The separation or segmentation of functionality as discussed herein is presented for illustrative purposes only.

Beginning with step 503, the gateway 106 receives a connection request from a client application 136 executed in a client device 103 over the external network 121. At step 506, the gateway 106 determines one or more device management attributes 321 associated with the client device 103. For example, the gateway 106 can communicate with the device management service 104 to determine the device management attributes 321, or the device management attributes 321 can be presented by the management application 133 executed by the client device 103.

At step 509, the gateway 106 determines a network address and/or a port address to be assigned to the connection. In some cases, the network address and/or port address can be determined based at least in part on the device management attributes 321. At step 512, the gateway 106 creates a virtual private network (VPN) tunnel having a VPN tunnel endpoint 125 for the connection. The gateway 106 assigns the network address and/or port address to the VPN tunnel endpoint 125.

At step 515, the gateway 106 receives data from the client application 136 through the VPN tunnel endpoint 125. The data is associated with an intended destination network resource 109. At step 518, the gateway 106 adds the device management attributes 321 to the headers 303 of a packet 300 containing the data as a data payload 306. For example, the gateway 106 can encapsulate the data using generic routing encapsulation (GRE) or another form of encapsulation in order to add the additional headers 303.

At step 521, the gateway 106 forwards the packet 300 based on the device management attributes 321. Specifically, the gateway 106 can evaluate the device management attributes 321 for compliance with one or more compliance rules or routing rules in order to determine whether to forward the packet 300 or how to forward the packet 300. The rules that are evaluated can determine a security group associated with the client application 136, and based on the security group, the packet 300 can be routed to a particular virtual network segment or microsegment. For example, a compliance rule can specify that packets 300 associated with a compliance status 339 of non-compliant should be dropped or routed to a default virtual network segment with a default network resource 109. Routing to a default network resource 109 can be used to provide a graceful failure with an error message indicating the non-compliance or why the client device 103 is considered non-compliant. This can allow the user to take action to remedy the non-compliance.

In some cases, the gateway 106 can route the packet 300 to a destination network resource 109 that ultimately will be unreachable through the virtual network segment to which the packet 300 is forwarded. This can be because the device management attributes 321 can change and be reevaluated before the packet 300 arrives at its intended destination. Thereafter, the process can proceed to completion.

Figure 6:
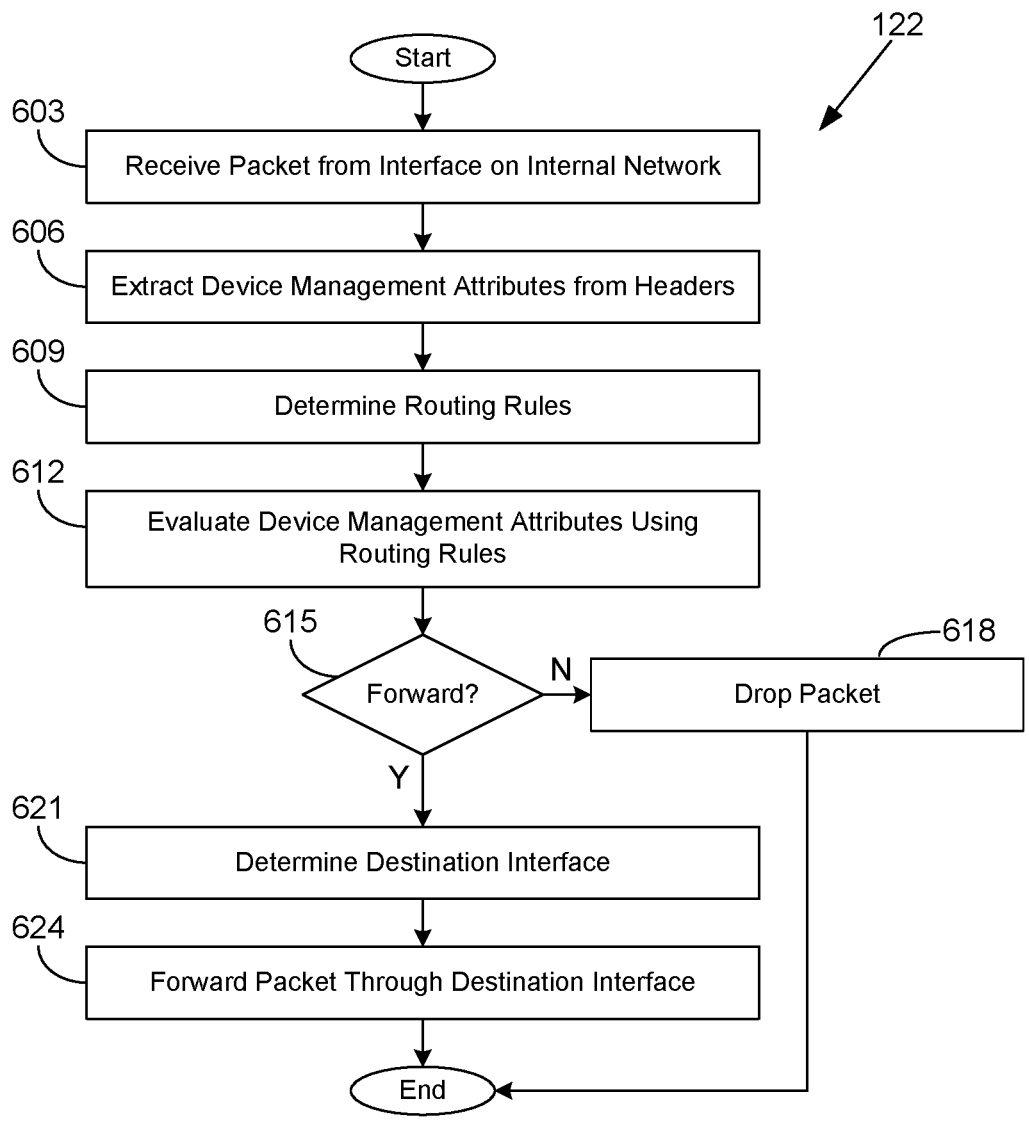

Turning now to FIG. 6, shown is a flowchart that provides one example of the operation of a network device 122. Functionality attributed to the network device 122 can be implemented in a single process or application or in multiple processes or applications. The separation or segmentation of functionality as discussed herein is presented for illustrative purposes only.

Beginning with step 603, the network device 122 receives a packet 300 from an interface on the internal network 118. The packet 300 can be initially forwarded by the gateway 106, but the network device 122 can receive the packet 300 from the gateway 106 or another network device 122. At step 606, the network device 122 extracts one or more device management attributes 321 from the headers 303 of the packet 300. At step 609, the network device 122 determines one or more routing rules as configured by the network controller 115.

At step 612, the network device 122 evaluates the device management attributes 321 using the routing rules that apply. For example, a routing rule can indicate that packets 300 originating from an unapproved location 336 should not be forwarded to a given virtual network segment, or should be forwarded to a failover virtual network segment. As another example, a routing rule can indicate that packets 300 with a jailbreak status 342 of "jailbroken" or a compliance status 339 of non-compliant should not be forwarded to a given virtual network segment, or should be forwarded to a failover virtual network segment. As yet another example, a routing rule can indicate that only packets 300 from certain client applications 136, certain client devices 103, or certain users or user types can be forwarded to a given virtual network segment. As yet another example, a routing rule can indicate that only packets 300 from an approved operating system version can be forwarded to a given virtual network segment. As yet another example, a routing rule can indicate a geofence, and that only packets 300 with a location 336 within the geofence can be forwarded to a given virtual network segment.

At step 615, the network device 122 determines whether to forward the packet 300 based on the evaluation of the routing rules. If the network device 122 determines not to forward the packet 300, the network device 122 can drop the packet 300 at step 618, and the process proceeds to completion.

Alternatively, if the packet 300 is to be forwarded, the network device 122 continues from step 615 to step 621 and determines a destination interface on the internal network 118. For example, the network device 122 can determine the destination interface associated with a specified destination network resource 109 on a particular virtual network segment. At step 624, the network device 122 forwards the packet 300 through the destination interface. Thereafter, the process can proceed to completion.

The flowcharts of FIGS. 5 and 6 and the sequence diagram of FIG. 4 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagram show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The client device 103, the gateway 106, the network controller 115, the network resources 109, the network devices 122, the device management service 104, or other components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the client device 103, the gateway 106, the network controller 115, the network resources 109, the network devices 122, the device management service 104, and/or other components can be stored in one or more storage devices and be executable by one or more processors. Also, a data store can be stored in the one or more storage devices.

The client device 103, the gateway 106, the network controller 115, the network resources 109, the network devices 122, the device management service 104, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A non-transitory computer-readable medium embodying executable instructions, wherein the instructions, when executed by at least one processor, cause at least one computing device to at least:
  divide an internal network into a plurality of virtual network segments, wherein the plurality of virtual network segments comprise different configurations of a plurality of resources of the internal network;
  receive, by a network device in the internal network, a packet comprising at least one device management attribute embedded in a packet header, wherein the at least one device management attribute corresponds to a client device in an external network;
  extract, by the network device in the internal network, the at least one device management attribute from the packet header;
  determine a compliance status of the client device based on the at least one device management attribute; and
  forward the packet within the internal network based on a compliance status of the client device.

2. The non-transitory computer-readable medium of claim 1, wherein the instructions, when executed by the at least one processor, cause the at least one computing device to at least:
configure, by a network controller, at least one routing rule for a virtual network segment.

3. The non-transitory computer-readable medium of claim 2, wherein the instructions, when executed by the at least one processor, cause the at least one computing device to at least:
identify, by the network device, the at least one routing rule for the virtual network segment.

4. The non-transitory computer-readable medium of claim 3, wherein the network device forwards the packet within the internal network based on the compliance status of the client device and the at least one routing rule for the virtual network segment.

5. The non-transitory computer-readable medium of claim 1, wherein the instructions, when executed by the at least one processor, cause the at least one computing device to at least:
identify a destination interface specified for the packet, wherein the packet is forwarded within the internal network based on the destination interface and the compliance status of the client device.

6. The non-transitory computer-readable medium of claim 1, wherein network device provides access to a virtual network segment, and the packet is forwarded from a gateway device to the network device based on the virtual network segment.

7. The non-transitory computer-readable medium of claim 1, wherein the packet is forwarded to a failover virtual network segment based on the compliance status indicating non-compliance with at least one routing rule.

8. A system, comprising:
at least one computing device; and
at least one data store comprising executable instructions, wherein the instructions, when executed by at least one processor, cause the at least one computing device to at least:
divide an internal network into a plurality of virtual network segments, wherein the plurality of virtual network segments comprise different configurations of a plurality of resources of the internal network;
receive, by a network device in the internal network, a packet comprising at least one device management attribute embedded in a packet header, wherein the at least one device management attribute corresponds to a client device in an external network;
extract, by the network device in the internal network, the at least one device management attribute from the packet header;
determine a compliance status of the client device based on the at least one device management attribute; and
forward the packet within the internal network based on a compliance status of the client device.

9. The system of claim 8, wherein the instructions, when executed by the at least one processor, cause the at least one computing device to at least:
configure, by a network controller, at least one routing rule for a virtual network segment.

10. The system of claim 9, wherein the instructions, when executed by the at least one processor, cause the at least one computing device to at least:
identify, by the network device, the at least one routing rule for the virtual network segment.

11. The system of claim 10, wherein the network device forwards the packet within the internal network based on the compliance status of the client device and the at least one routing rule for the virtual network segment.

12. The system of claim 8, wherein the instructions, when executed by the at least one processor, cause the at least one computing device to at least:
identify a destination interface specified for the packet, wherein the packet is forwarded within the internal network based on the destination interface and the compliance status of the client device.

13. The system of claim 8, wherein network device provides access to a virtual network segment, and the packet is forwarded from a gateway device to the network device based on the virtual network segment.

14. The system of claim 8, wherein the packet is forwarded to a virtual network segment based on the compliance status indicating compliance with at least one routing rule for the virtual network segment.

15. A method, comprising:
dividing an internal network into a plurality of virtual network segments, wherein the plurality of virtual network segments comprise different configurations of a plurality of resources of the internal network;
receiving, by a network device in the internal network, a packet comprising at least one device management attribute embedded in a packet header, wherein the at least one device management attribute corresponds to a client device in an external network;
extracting, by the network device in the internal network, the at least one device management attribute from the packet header;
determining a compliance status of the client device based on the at least one device management attribute; and
forwarding the packet within the internal network based on a compliance status of the client device.

16. The method of claim 15, further comprising:
configuring, by a network controller, at least one routing rule for a virtual network segment.

17. The method of claim 16, further comprising:
identifying, by the network device, the at least one routing rule for the virtual network segment.

18. The method of claim 17, wherein the network device forwards the packet within the internal network based on the compliance status of the client device and the at least one routing rule for the virtual network segment.

19. The method of claim 15, further comprising:
identifying a destination interface specified for the packet, wherein the packet is forwarded within the internal network based on the destination interface and the compliance status of the client device.

20. The method of claim 15, wherein network device provides access to a virtual network segment, and the packet is forwarded from a gateway device to the network device based on the virtual network segment.

* * * * *